May 26, 1953
S. F. PASTURCZAK
2,639,569
SELF-PROPELLED HARVESTER WITH AUTOMATICALLY
CONTROLLED VARIABLE-SPEED DRIVE
Filed May 18, 1950
2 Sheets-Sheet 1
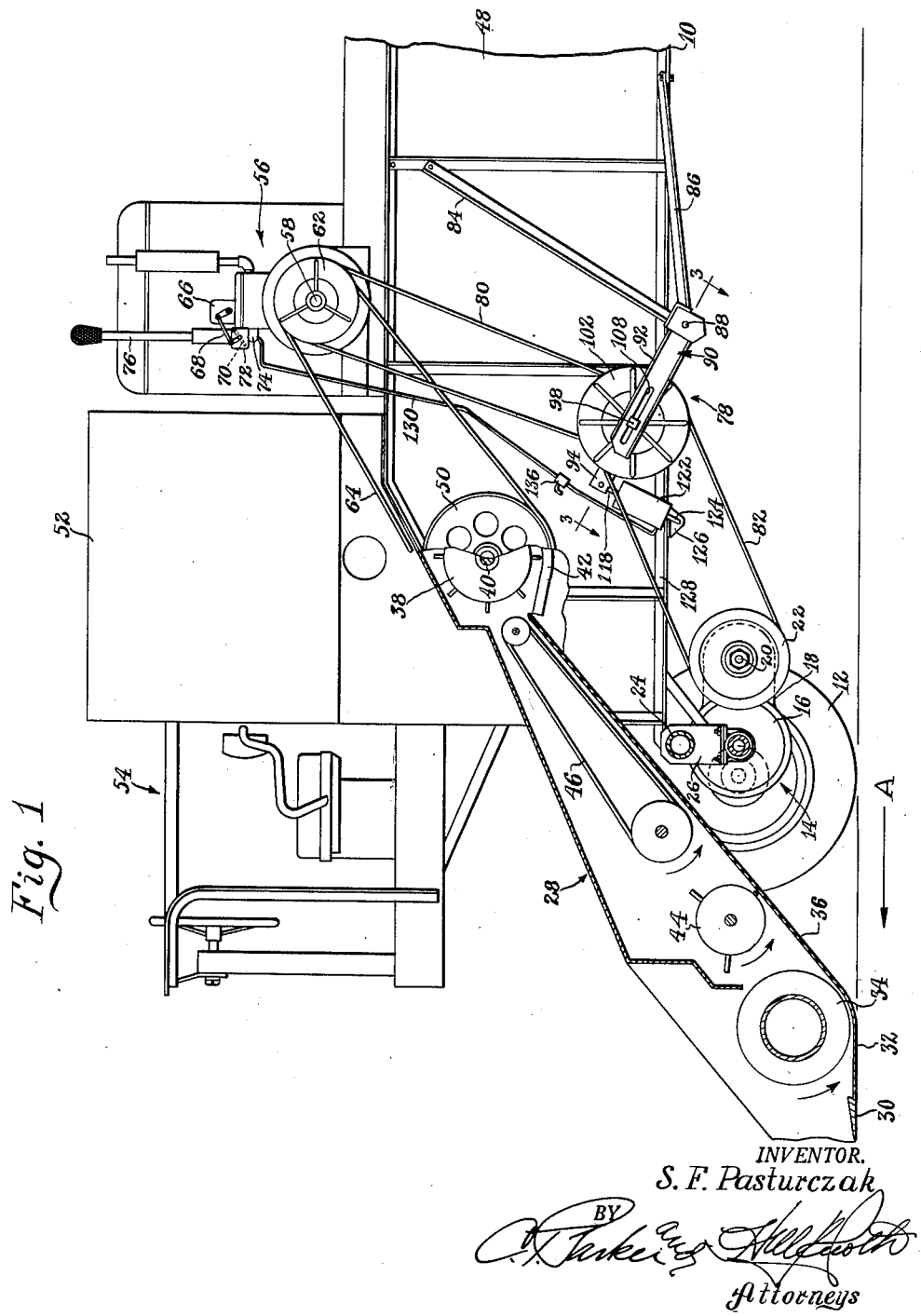

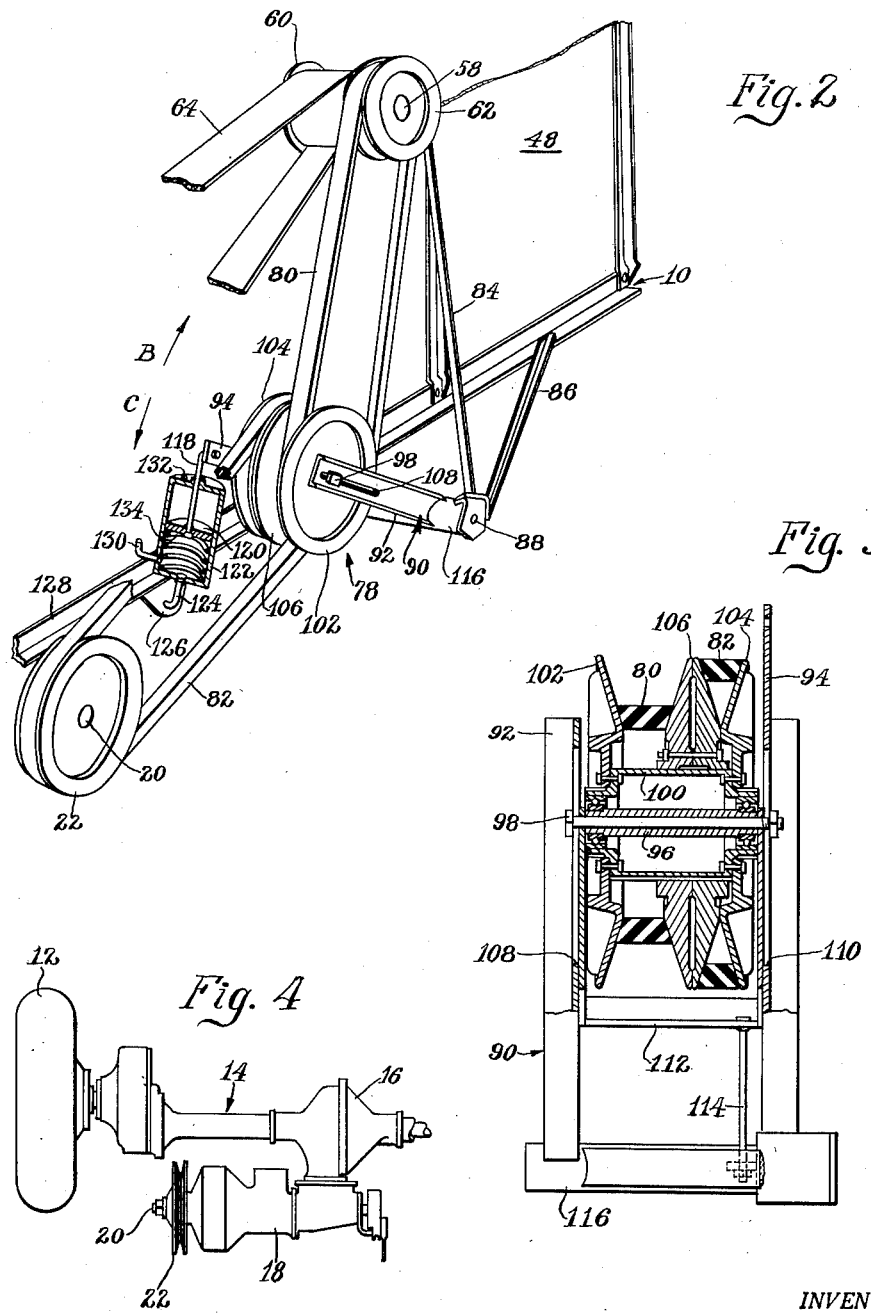

Patented May 26, 1953

2,639,569

UNITED STATES PATENT OFFICE 2,639,569

SELF-PROPELLED HARVESTER WITH AUTOMATICALLY CONTROLLED VARIABLE-SPEED DRIVE

Stanley F. Pasturczak, East Moline, Ill., assignor to Deere & Company, Moline, Ill., a corporation of Illinois Application May 18, 1950, Serial No. 162,765

1 Claim. (Cl. 56—20)

This invention relates to a harvester or crop-handling machine and more particularly to control means for drive mechanism of such machine operative to coordinate the ground speed of the machine with the crop-handling ability of the machine.

Although the invention may have rather wide application among crop-handling machines such as combines, balers or the like, the preferred embodiment disclosed herein was designed primarily for use in a combine. Therefore, combine constructions will be referred to herein as typical of the environment in which the invention may be utilized.

The conventional self-propelled combine comprises a main frame carried by traction wheels or equivalent propelling means for advance over a field and has harvesting or gathering means for harvesting or gathering crops from the field. As the machine advances, the crops are transferred to crop-handling means such as a threshing cylinder. The operation in this respect is substantially the same whether the grain is harvested at the time and immediately fed to the threshing cylinder or previously cut and windrowed and subsequently picked up and fed to the threshing cylinder. A combine of this type is provided with an internal combustion engine provided with governor-regulated fuel supply means to maintain the speed of the engine substantially constant at varying loads within the ability of the engine. The rotatable threshing cylinder is driven at a predetermined substantially constant rate by fixed-ratio drive means connected to an output member of the engine. The connection between the output member of the engine and the traction wheels normally involves variable-speed or adjustable-ratio means whereby the ground speed of the combine may be varied without effecting variation in engine or cylinder speed. Heretofore, variation in the variable-speed means has been effected by manually controlled means, or means in which the control is initially manually effected.

When it is said that the drive means between the engine and the threshing cylinder is effected at a fixed ratio, it must be borne in mind that selective means are usually provided for setting various fixed ratios according to types of crops being handled. Apart from this, it may be considered for all practical purposes that the rate at which the cylinder operates is substantially constant once set, for what is important here is that ground speed may be varied without theoretically, at least, varying cylinder or engine speed. This characteristic is important from the standpoint of preventing stalling of the machine because of overloading of the cylinder. For example, if the crop is relatively light and the stream of crops fed to the cylinder is relatively thin, it is desirable to maintain a relatively high ground speed so that the cylinder will operate at highest efficiency. On the other hand, if a condition of excessively heavy crop is encountered, the cylinder will become overloaded unless the operator becomes aware of the situation and immediately decreases the ground speed of the machine. Of course, it is expected that a skilled operator will appreciate the varying conditions and by use of the conventional controls make the necessary adjustment so that the machine operates at highest efficiency. On the other hand, it may be expected that means that automatically accommodates changing conditions would be preferable, and even extremely desirable, especially since the operation of a combine involves more than merely keeping the combine in the same field with the grain.

Accordingly, it is one of the principal objects of the present invention to provide automatic control means for accommodating varying operational conditions such as those outlined above and to accomplish the necessary results by varying ground speed in accordance with crop conditions as determined by varying crop loads imposed on a cylinder or equivalent crop-handling means rotatable or otherwise operative at a substantially constant rate. More specifically, it is an object to provide an automatic control for a machine of the character referred to above comprising means associated with the crop-handling means or cylinder and operative to reflect increases in crop load on the cylinder in excess of what the cylinder can efficiently handle, together with means associated with the load-reflecting means and the variable ground-speed means for adjusting the latter to decrease the speed of advance of the machine while maintaining the cylinder rate substantially constant. Still more specifically, it is an object to accomplish these results by coordination of control means and an internal combustion engine of the type having a combustible-mixture-intake manifold including an adjustable throttle and a speed-governor controlling the throttle to vary the throttle opening according to variations in load imposed on the engine whereby to maintain the engine speed substantially constant within limits determined by the ability of the engine. The control means includes a device responsive to changes in manifold pressure effected by governor-controlled changes in throttle position reflecting varying crop loads imposed on the engine via the fixed-ratio drive- and load-transmitting means between the output member of the engine and the cylinder or equivalent crop-handling means.

A still further object of the invention is to provide a control device of the character referred to that may be readily adapted to or incorporated in the structure of combines or other crop-handling machines of certain existing types.

The foregoing and other important objects and desirable features inherent in and encompassed by the invention will become apparent as a complete disclosure of a preferred embodiment of the invention is made in the following detailed description and accompanying sheets of drawings, in which:

Figure 1 is a side elevational view, partly in section, showing a self-propelled combine as typical of one form of crop-handling machine to which the invention is applicable;

Figure 2 is a fragmentary perspective view, on an enlarged scale, and partly in section, showing generally the main components of the drive means;

Figure 3 is an enlarged sectional view of a portion through part of the variable speed means for driving the propelling means from the engine, the view being taken substantially along the line 3—3 of Figure 1;

Figure 4 is a plan view of the forward portion of one side of the combine showing part of the propelling means for carrying the main frame of the combine for advance over the field.

The combine chosen for the purposes of illustration comprises a main frame or body 10 carried for advance over the ground or a field from which crops are to be harvested, in the direction of the arrow A (Figure 1), by ground-engaging supporting elements in the form of propelling or traction means or wheels 12 (only one of which is shown) carried at opposite ends of a transverse axle structure 14 (Figures 1 and 4). The drawings omit a rear support for the combine frame or body 10, but it will be appreciated that any conventional rolling support may be utilized.

The axle structure 14 includes intermediate its ends a differential gear housing 16 within which may be contained conventional differential gearing (not shown) operatively connected to transmission gearing (likewise not shown) contained within a transmission housing 18 bolted directly to the differential gear casing 16. The transmission mechanism may contain change-speed gearing shiftable to provide different gear or speed ratios between the traction or propelling wheels 12 and a transmission input shaft 20 on which is keyed a V-belt sheave 22. In so far as the present consideration of the invention is involved, the particular details of any transmission mechanism provided between the input shaft 20 and the traction wheels 12 may be disregarded and it may be assumed that this shaft and these wheels are directly connected in driving relationship. The structure illustrated is merely representative of many types that could be employed and, apart from details omitted, is taken substantially from the disclosure in assignee's co-pending application Serial No. 725,629, filed January 31, 1947, now Patent No. 2,510,325.

The forward end of the main frame or body 10 is appropriately supported on the transverse axle structure 14 by means of supporting structure including a transverse tubular beam 24 and connecting plates 26 (only one of which is shown in Figure 1).

The forward portion of the main frame or body 10 includes harvesting or crop-receiving means designated generally by the numeral 28. In the present instance, this means includes a transverse cutter bar 30 operative in advance of the wheels 12 and associated with which is a platform 32 and platform auger 34 of conventional design. Standing grain harvested by the cutting mechanism 30 as the combine advances is delivered rearwardly to the auger 34 which ultimately transfers the material still further rearwardly to a feeder house behind the auger and having an upwardly inclining floor 36 leading to a crop-handling element here in the form of a rotatable cylinder 38 fixed to a transverse rotatable cylinder shaft 40 and cooperative in a conventional manner with a thresher concave 42. A beater 44, which may be of conventional design, operates behind the auger 34 and over the feeder house floor 36 to facilitate the advance of crops upwardly to a raddle or conveyor-type feeder 46 for ultimate feeding to the cylinder 38 and concave 42.

In the event that the combine is operated over a field in which the grain has already been cut and windrowed, a pick-up means of conventional construction will be utilized ahead of the platform, but the handling of the crop and the feeding thereof to the cylinder will have characteristics similar to those involved in a straight combining operation.

The shaft 40 for the cylinder 38 constitutes an input shaft and projects transversely outwardly at the left-hand side sheet 48 of the body 10 to have keyed or otherwise fixed thereto a drive pulley 50.

The forward portion of the main frame or body 10 includes a grain tank 52 ahead of which is an operator's station 54 including the various controls for operating the combine, the details of which are not shown, since they form no part of the present invention.

The combine is equipped with a power source for the cylinder 38 and traction wheels 12, here in the form of an internal combustion engine 56 having a power output shaft 58. In this case, the shaft 58 is the rear end of the engine crankshaft and has keyed or otherwise fixed thereto for rotation therewith first and second output members such as a pulley 60 and a V-belt sheave 62. An endless flat belt 64 is trained about the engine pulley 60 and the cylinder pulley 50 and constitutes fixed-ratio drive- and load-transmitting means interconnecting the engine 56 and cylinder 38. Hence, any variations in engine speed will be reflected in the cylinder 38; also, any variations in cylinder speed because of load imposed thereon will be reflected in engine speed.

However, the engine is governed as to speed and rated load so that engine speed is maintained theoretically substantially constant even though the load on the engine varies, all, of course, within the ability of the engine. For this purpose, the engine may be equipped with a governor 66 of any conventional design, which through appropriate linkage 68 regulates a throttle 70 in a carburetor 72 associated with an intake manifold 74 and supplied with cleaned air through an air intake stack 76. The arrangement functions in the usual manner, the governor 66 being responsive to variations in engine speed to open or close the throttle 70 as required. Broadly, the means 66—76 constitutes governor-controlled fuel supply means for the engine 56. Since the governor 66 maintains the engine speed substantially constant, the cylinder speed or rate will be maintained substantially constant, ignoring slippage of the belt 64.

The engine 56 is connected to drive the traction means 12 by variable-ratio drive means including the engine output sheave 62 and the propelling means input sheave 22, together with an adjustable variable-speed device 78 and appropriate driving belts 80 and 82 connected respectively between the engine output sheave 62 and the device 78 and between the device 78 and the transmission input sheave 22.

The particular variable-speed device chosen here for the purposes of illustration is taken from the disclosure in assignee's patent identified above. The device is shown generally in Figures 1 and 2 of the instant disclosure and more in detail in a sectional view in Figure 3. Appropriate frame members 84 and 86 provide mounting structure, including a pivot 88 on an axis parallel to the axis of the engine and transmission shafts, for swingably mounting a yoke 90 between arms 92 and 94 of which is carried a short transverse shaft 96. The shaft 96 is retained by a bolt 98 between the arms 92 and 94 and journals a hub 100 for a double adjustable variable-speed pulley assembly including outer axially fixed members 102 and 104 and an intermediate axially shiftable double-faced member 106.

The variable-speed pulley assembly as a whole may be adjusted lengthwise of the arms 92 and 94 by means of slots 108 and 110 provided respectively in the arms and a secondary yoke 112 the position of which relative to the arms 92 and 94 may be changed by an adjusting member 114 connected between the yoke 112 and a transverse tubular member 116 which forms part of the means that effect swinging mounting of the yoke 90 on the pivot 88. For the present purposes, the adjustability of the variable-speed pulley assembly relative to the yoke 90 may be ignored.

The variable-speed unit may be swung about the pivot axis at 88 to vary in infinite proportions within limits the distances between the unit and the output and input sheaves 62 and 22, the intermediate variable-speed member 106 shifting axially between the two outer members 102 and 104 to accommodate varying positions of the belts 80 and 82. The drive connection between the engine and the propelling means therefor is of the adjustable-ratio type whereby ground speed or speed of advance of the combine may be varied even though the engine and cylinder speeds are maintained substantially constant. In the present case, angular movement of the device 78 upwardly, or in the direction of the arrow B in Figure 2, results in a reduction in ground speed, since such movement tensions the belt 82, causing it to seek a smaller diameter between the variable speed members 102 and 106, thus effecting axial shifting of the intermediate member 106 to the right (as viewed in Figure 3), which in turn forces the belt 82 outwardly to a new and larger diameter. Conversely, when the variable-speed device 78 is shifted downwardly, or in the direction of the arrow C in Figure 2, ground speed of the combine is increased. Broadly, the variable speed device illustrated may be replaced by any appropriate ratio-changing means.

In assignee's patent identified above, changes in position of the variable-speed device 78 are accomplished manually by appropriate controls located at the operator's station and connected to the swinging yoke 90. This arrangement is quite satisfactory in average conditions, or even in extreme conditions with the combine in the hands of an especially skilled operator. As explained above, the general requirements are that the ground speed of the combine be adjusted to accommodate variations in crop loads imposed on the harvesting and threshing mechanism. Specifically, the problem is to operate the combine so that the threshing mechanism functions at maximum efficiency, which in turn depends upon the amount of crops fed to the cylinder 38. In extremely light crop conditions, it is necessary that the ground speed of the combine be increased so that more of the lighter crop is fed to the cylinder. In extremely heavy crop conditions, it is required that the ground speed of the combine be decreased to enable the cylinder 38 to handle the heavy crop without clogging or stalling, since it is obvious that excess crop loads imposed on the cylinder 38 could well be more than the engine 56 can handle. In other words, regardless of the control of the engine by the governor 66, the engine can be stalled when called upon to perform beyond its rated load.

According to the present invention, there is provided automatic control means for accommodating ground speed of the combine to crop conditions according to crop loads imposed on the cylinder 38 as reflected in engine performance. The inner arm 94 of the variable-speed yoke 90 is longer than the other arm 92 and is connected to a piston rod 118 of a piston 120 which forms part of a fluid-pressure motor including a cylinder 122. The closed end of the cylinder is provided with a connector 124 by means of which the cylinder is mounted on a bracket 126 secured to a longitudinal frame member 128 running along the left-hand side sheet 48.

The closed end of the cylinder 122 is connected by a vacuum line or pipe 130 to the intake manifold 74. The opposite end of the cylinder 122 is vented to atmosphere at 132. Biasing means in the form of a coiled compression spring 134 (Figure 2) is interposed between the closed end of the cylinder 122 and the proximate face of the piston 120. The spring 134 functions normally to urge the variable-speed device 78 in the direction of the arrow B. The spring is at times dominated and overcome by relatively high manifold vacuum, applied through the line 130 from the intake manifold 74 to the lower end of the cylinder 122, so that the variable speed device 78 is influenced in the direction C. In short, under conditions of relatively high manifold vacuum, the ground speed of the combine will be relatively high. Conversely, under conditions which cause manifold vacuum to drop off, the spring 134 takes precedence and reduces the combine ground speed.

As indicated in Figure 1, a cut-out valve 136 is provided in the line 130 so that the cylinder 122 may be disconnected from the manifold 74. Such disconnection may be desirable in particularly adverse circumstances, as where the crop is relatively heavy and the terrain is relatively rough, in which circumstances it will be found desirable to operate the combine at a relatively low ground speed, which result will be obtained because of maximum extension of the spring 134.

The operation of the combine is briefly as follows: With the cut-out valve 136 open, the intake manifold 74 is connected to the lower end of the cylinder 122 via the vacuum line 130. Assuming that the combine is operating under crop conditions in which the threshing cylinder 38 is capable of handling crop fed thereto at maximum efficiency, the governor 66 will maintain engine speed substantially constant. Likewise, cylinder speed will be substantially constant. If there are no variations in crop load, ground speed will be substantially constant, since the variable speed device will be maintained in some intermediate position because of opposition of the atmosphere through the vent 132 to the spring 134, these forces acting, of course, on opposite sides of the piston 120. In the event that a particularly heavy stand or windrow of crop is encountered by the harvesting means, the cylinder 38 will become temporarily overloaded. The temporary overloaded condition will be accompanied by a slight reduction in speed, but the cylinder speed will be immediately brought back to normal because of the governor 66. As the governor 66 opens the throttle to supply more fuel-air mixture to the engine, manifold vacuum drops fast, with the result that the spring 134 moves the piston 120 upwardly or outwardly so that the yoke 80 of the variable speed device 78 is moved in the direction of the arrow B, thus reducing the ground speed of the combine.

Now, should the heavy stand or windrow of crops be passed, the load on the cylinder 38 will be correspondingly light, whereby the cylinder speed will have a tendency to increase. As before, the variations in cylinder speed and load are reflected in the engine 56 because of the action of the governor 66. In this case, the governor will function to close the throttle 70, which will result in the creation of relatively high manifold vacuum, whereupon the piston 120 will move inwardly or downwardly in the cylinder to shift the variable-speed device 78 in the direction of the arrow C, thereby increasing ground speed of the combine.

The preferred form of the invention is particularly adapted to combines or other machines in which speed changes are effected by variable-speed devices of the type illustrated. In this respect, the adaptation of the control to the combine shown may be considered one of the specific features of the invention. In its broader aspects, however, the invention contemplates the application to other control and variable-speed devices of the principles involving variable ground speed and substantially constant speed or rate of crop-handling elements. Other modifications and alterations in the preferred form of the invention illustrated will readily occur to those versed in the art, all of which may be achieved without departing from the spirit and scope of the invention as defined in the appended claim.

What is claimed is:

A harvester, comprising: a main frame having traction means for advancing the main frame over a field; crop-handling means connected to the main frame for receiving crops from the field as the main frame advances; substantially constant-speed power means on the main frame; fixed-ratio drive means connecting the power means and the crop-handling means for driving the crop-handling means at a substantially constant speed; adjustable variable-ratio drive means connecting the power means and the traction means; and means operative in response to conditions imposing an increased load on the power means for automatically adjusting the variable-ratio drive means to reduce the speed of advance of the main frame.

STANLEY F. PASTURCZAK.

References Cited in the file of this patent

UNITED STATES PATENTS

| Number | Name | Date |
| --- | --- | --- |
| 954,394 | Holt | Apr. 5, 1910 |
| 2,150,456 | Perrine | Mar. 14, 1939 |
| 2,212,465 | Baldwin | Aug. 20, 1940 |
| 2,329,831 | Clapper | Sept. 21, 1943 |
| 2,510,325 | Anderson | June 6, 1950 |
| 2,521,457 | Heyer | Sept. 5, 1950 |
| 2,528,275 | Heth | Oct. 31, 1950 |